(12) United States Patent
Fidge

(10) Patent No.: US 6,289,538 B1
(45) Date of Patent: Sep. 18, 2001

(54) VARIABLE CONTOUR HEAD SUPPORT

(76) Inventor: Binkley W. Fidge, 916 Aalapappa, Kailua, HI (US) 96734

( * ) Notice: Subject to any disclaimer, the term of this patent is extended or adjusted under 35 U.S.C. 154(b) by 0 days.

(21) Appl. No.: 09/464,084

(22) Filed: Dec. 16, 1999

(51) Int. Cl.[7] .................................................. A47G 9/02
(52) U.S. Cl. ...................... 5/640; 5/644; 5/637; 297/393
(58) Field of Search ..................... 297/393, 397; 5/636, 637, 639, 640, 644, 904

(56) References Cited

U.S. PATENT DOCUMENTS

| | | |
|---|---|---|
| 673,872 | 5/1901 | Hillern-Flinsch . |
| 682,871 | 9/1901 | Hogan et al. . |
| 1,473,506 | 11/1923 | Nessler . |
| 1,787,832 | 1/1931 | Mueller . |
| 3,141,179 * | 7/1964 | McLean ................................... 5/642 |
| 3,608,964 | 9/1971 | Earl . |
| 4,097,086 | 6/1978 | Hudson . |
| 4,345,347 | 8/1982 | Kantor . |
| 4,617,691 | 10/1986 | Monti et al. . |
| 4,679,262 | 7/1987 | Davis et al. . |
| 4,679,263 | 7/1987 | Honer . |
| 4,805,603 * | 2/1989 | Cumberland .......................... 5/640 X |
| 4,862,438 * | 8/1989 | Fry ........................................ 5/904 X |
| 4,991,222 * | 2/1991 | Nixdorf ................................ 5/904 X |
| 5,123,133 * | 6/1992 | Albert .................................... 5/639 |
| 5,129,705 | 7/1992 | Wray . |
| 5,205,611 | 4/1993 | Stephens . |
| 5,220,700 | 6/1993 | Liu . |
| 5,454,781 | 10/1995 | Chitwood . |
| 5,505,523 * | 4/1996 | Wang ..................................... 5/640 |
| 5,906,878 | 5/1999 | Horning et al. . |
| 6,006,380 * | 12/1999 | Sramek ................................ 5/640 X |
| 6,122,784 * | 9/2000 | Hurwitz .................................. 5/636 |

* cited by examiner

Primary Examiner—Michael F. Trettel
(74) Attorney, Agent, or Firm—Venable; Gary L. Shaffer; Chad C. Anderson

(57) ABSTRACT

A support for the head and neck comprises a cushion that extends upwardly from at least one of the user's shoulders to at least a portion of one of the user's ears. The support can include means for varying both the size and shape of the cushion so that its dimensions can be varied during use by an individual user and configured for use by many individuals. The support also can include means for attaching or enclosing one or more audio devices so that, for example, music or soothing sounds can be provided to one or both ears of a user. The invention is positioned at least partly by one or both of an adjustable attachment strap and a positioning scrim. The positioning scrim can be reversibly interposed between the user's back and a chair in which the user is seated.

29 Claims, 13 Drawing Sheets

VARIABLE CONTOUR HEAD SUPPORT

FIELD OF THE INVENTION

The present invention relates to a variable contour cushion for supporting a user's head when he is in a seating or partially reclining position.

BACKGROUND OF THE INVENTION

Attempting to relax in a seated or semi-reclining position for an extended period of time can be fatiguing for the muscles of the neck and shoulders. This is particularly true when one is seated in an airplane, bus or automobile. The attempt at relaxation of muscles on one side of the mid-saggital plane of the head causes the head to droop in the opposite direction. Similarly, relaxation of the muscles in the back of the head and shoulders causes the head to droop forward which may result in muscle and skeletal pain and a general discomfort particularly when one is attempting to relax or sleep.

One method of dealing with this problem is to use head pillows or cushions to attempt to support the head with respect to the rest of the body. However, because such devices are soft to the degree that they do not retain a particular required shape, they do not support a user's head well. As a consequence, even though the head may be supported somewhat, muscle soreness and neck strain often result.

Devices in the prior art have attempted to deal with this problem in a number of ways. Some prior art head support devices are cushions which rely on their bulk and deformability to provide support for the head. However, they do not conform acceptably to fit the contours of the human head, neck and shoulder area. Like common bed pillows and cushions, such devices lack the shape retention necessary for proper head support. U.S. Pat. No. 4,679,262 to Davis et al., discloses a cushion for supporting the head of the user comprising a relatively stiff body constituting a segment of a torus. The device of Davis, et al. is shaped such that its body extends from a location adjacent to the mastoid process behind the user's ear forwardly under the chin to a point beyond the mid-sagittal plane to the mental terminus of the user's mandible. The invention of Davis et al., however, requires that the head recline at a relatively acute angle in order to pin the device between the head and shoulder of a user. As a consequence, a user's head is not held in a comfortable position. U.S. Pat. No. 4,617,691 to Monti et al. discloses a generally rectangular support pillow adapted to be removably secured circumjacent a user's neck. The device of Monti et al., has wedge-shaped pillow segments intended to support a user's head in a number of different positions. Disadvantageously, the collar-like shape of the device is cumbersome while not providing sufficient vertical support so that the head is in an acceptably upright position.

Other devices rely on a horseshoe-shaped configurations in order to provide support to a particular anatomical portion of the head and or neck. For example, U.S. Pat. No. 4,345,347 to Cantor discloses a C-shaped cushion having a thickened central portion contoured to fit behind the neck of a user as high as a user's occipital ridge wherein the arms of the "C" are configured to fit on either side of the user's neck. The device of Cantor provides little lateral support, however, and therefore requires the user's neck muscles to continue supporting the weight of the head.

Many people prefer an adjustable head support which permits the user to change the relative position of the head to the neck and shoulders. Adjustability allows an individual to vary critical dimensions of a support and thereby help to further avoid fatigue, particularly when the support is being used for a long period. Similarly, the ability to reduce the size of a support for transport and storage is of particular advantage especially when the support will be carried in luggage when not being used. There is therefore a need for a cushioned head support that will permit the user to hold the head in a reasonably upright position while resting the muscles of both sides of the neck and shoulders. There is also a need for a support having variable dimensions and contours so that it me be variably adjusted by a user and can be transported and stored with relative ease.

SUMMARY OF THE INVENTION

The present invention relates generally to cushions and devices for supporting the head with respect to the body and, more specifically, pertains to a contoured pillow which is selectively positionable adjacent a person's head, neck and shoulders such that it provides a comfortable support for the person's head and neck. In addition, the present invention provides means for adapting other devices, such an alarm clock, portable radio, headphone or other audio device, to use therewith.

This invention provides a resilient cushion means having contoured surfaces that fit comfortably on the shoulder and side of the face of a user. In some preferred embodiments, the resilient cushion extends upwardly at least to the level of the user's ear in order to comfortably support the head and to provide an aural, that is, auditory, connection between the user's ear and an audio device disposed within a pocket on the resilient cushion. In some preferred embodiments, an air-inflatable bladder is provided as one means to vary the shape and compressibility of the device while in use. The resilient cushion is provided with one or more means for helping it maintain its position with respect to portions of the user's body and with respect to a chair in which the user may be sitting.

The resilient cushion portion of the invention includes optionally one or more pockets for retaining an one or more audio devices such as a radio, alarm, or tape player to provide entertainment or soothing sounds to a user. Alternatively, a pocket may be used to house an alarm clock or clock radio. An attachment strap can also be provided for attaching the headphones of, for example, an airline radio or television so that a user of the present device can relax while listening to entertainment having an audio aspect. The present invention also provides a positioning scrim constructed and arranged to be interposed between the user's back and a chair in which he is sitting in order to position the resilient cushion with respect to the head, neck and shoulders of a user. In some preferred embodiments of the invention, an attachment strap can be positioned around the neck of a user for connecting opposite portions of the resilient cushion. Optionally, an ear hollow is provided in the resilient cushion element of the invention for comfort of the user and to allow transmission of sound which may be generated by an audio device used with the invention.

Furthermore, the present invention is compressible for transport and storage using one or both of the positioning scrim and attachment strap to provide means for holding the cushion in a compressed state.

In some preferred embodiments, the present invention is provided with a fabric body casing whose maximum dimensions can be used to control the shape and maximum size of the resilient cushion. Thus, the present invention provides a variably contoured pillow means that can provide adequate support for a user's head and be compacted for easy transport and storage.

It is an object of the present invention to provide a contoured resilient head support that can be comfortably and easily maintained in position on at least one side of a user's head.

It is also an object of the present invention to provide means for varying the size and relative conformation of the head support so that it may be adjusted by the user to fit comfortably.

It is a similar object of the invention to provide means for incorporating one or more audio devices into the head support so that music, soothing sounds or other audible noises may be communicated to at least one ear of the user.

It is a further object of the present invention to provide a head support of resilient material so that it may be compressed for transport or storage.

In accordance with these and other objects of the invention, a contoured head support for supporting the head and neck of a user is provided. The head support comprises a resilient cushion including at least two attachment areas for attaching a retaining strap, a shoulder contact surface shaped for contact with a shoulder of a user, a head contact surface shaped for contact with a side of the head of a user, the head contact surface being constructed and arranged to extend upwardly to at least a portion of the ear of the user when in use, wherein the resilient cushion is constructed and arranged to be firm enough to support the weight of a user's head when in use and compressible enough to be compressed for storage when not in use, and a retaining strap constructed and arranged to be demountably attachable to the cushion at the at least two attachment areas and to pass around the neck, shoulder or torso of the user.

In accordance with other objects of the invention, the present invention further comprises a fabric casing enclosing the resilient cushion. The fabric casing can be of common fabric of natural or synthetic fibers having little or no stretch, or can be of stretchable fabric. In some preferred embodiments of the invention, the fabric casing is constructed and arranged such that the shape and maximum dimensions of the resilient cushion are determined by the dimensions of the casing. As is known in the fabric arts, fabrics can be engineered to have predictable amounts of stretch in a given direction. Thus, a fabric casing can be provided which can define the overall shape and relative dimensions of the resilient cushion element of the present invention and can stretch, contract or flex as the cushion is placed under compressive or tensioning loads.

One advantage attendant to this aspect of the present invention is that the resilient material of which the cushion is comprised can be made in shapes and sizes having dimensions that are larger than those of the maximum size of the fabric casing. Thus, the cushion material can be made in simplified geometric shapes that compress to the degree necessary to conform to the dimensions of the fabric casing. This allows a wider choice of cushion materials and similarly permits the use of materials such as plastic foams to be installed under a predictable degree of compression.

In some embodiments of the invention, the fabric casing is preferably formed of washable fabric, and provided with a zipper or other reusable closure such as hook-and-loop fasteners. Thus, the casing can be removed for cleaning or for the installation of absorbent pads or additional cushioning materials.

In accordance with further objects of the invention, the retaining strap may be attached to lower portions of the cushion or to the fabric casing or may be adjustable with respect to portions of the cushion or fabric casing such that a user may vary its position to achieve the most comfortable fit.

The device may further comprise a positioning scrim attached to the resilient cushion, the fabric casing or both, and constructed and arranged so that the position of the cushion with respect to the user's head, neck and shoulder is determined at least partly by the position of the scrim. Particularly, the positioning scrim is preferably constructed and arranged to lie disposed across a portion of the back of the user so that the scrim is reversibly interposed between the user's back and a surface upon which the user is leaning.

Advantageously, the resilient cushion of the present invention, or the fabric cover of the cushion, may further comprise an ear hollow constructed and arranged in the head contact surface of the cushion to receive at least a portion of an ear of said user. By providing such a hollow, the present invention allows not only for the comfort of the user but also optionally for covering the ear to thereby occlude sound. An additional option pertains to the provision of means for making an audible connection between one or more devices attached to, or residing within, the cushion and the ear of a user.

For example, in some embodiments, the resilient cushion further comprises a device pocket for attaching an audio device to the cushion, or a device chamber within the cushion for enclosing such a device. The audio device can be one or more of, for example, radios, compact disc players, recordable chips, mechanically powered audio devices, alarm clocks, clock radios and headphone speakers. Of course, any other audio device of appropriate size and configuration can be used with the present invention.

In some preferred embodiments of the of the invention, the resilient cushion may further comprise means for transmitting sound from the audio pocket through the cushion to an ear of the user, for example, an aural chamber disposed within the resilient cushion wherein the aural chamber is disposed between the audio device pocket and the ear hollow. As one of skill in the audio arts will appreciate, the configuration of the aural chamber may be of various shapes and sizes depending upon the type and sound transmitting properties of the material of which the cushion is formed, and the sound transmitting properties of the audio device being used with the present invention.

Moreover, means can also be provided with the present invention for varying the shape and/or size of the aural chamber. Such means would include plugs of various sizes and strictures for narrowing the effective diameter of the chamber. In other embodiments of the invention, the cushion is provided with a speaker disposed between the audio pocket and the ear hollow and having wiring and connector means leading into the pocket for connecting to an audio device disposed within the pocket.

Preferably, the adjustable retaining strap is constructed and arranged to surround the neck of the user and the positioning scrim is formed of one or more materials from the group consisting of fabrics of natural fibers, fabrics of synthetic fibers, fabrics of both natural and synthetic fibers, webbing of natural or synthetic fibers or of both, or netting material of natural or synthetic fibers or both. Preferably, the positioning scrim is elastically conformable to the contour of a user's back while retaining its longitudinal dimension so that the cushion is held firmly and dependably in a desired position with respect to the user's head, neck and shoulders. Preferably, the positioning scrim is constructed and arranged so that, when the cushion is compressed, the scrim forms a wrap-type container for the cushion. The attachment strap and scrim may be constructed and arranged so that one or both of the strap and scrim can also serve to hold the cushion in a compressed condition for storage or transport.

In accordance with still further advantageous objects of the invention, the resilient cushion further comprises means for varying its relative dimensions so that its shape and size may be adjusted to conform to the head and neck of the user and to support the head relative to the shoulder as desired by the user. One preferred means for varying the relative dimensions of the resilient cushion comprises means for adjusting the distance between the shoulder contact surface and the head contact surface such as a bladder which resides within a hollow in the resilient cushion wherein the bladder can be inflated and deflated by the user to adjust the absolute and relative dimensions of the resilient cushion.

Depending upon the shape and size of the desired embodiment of the present invention, the bladder itself can be of various shapes and sizes, and can have expansion characteristics tailored to a specific use or class of users. For instance, the bladder may be a pleated rectangular cube that can expand in one or more dimensions, in the shape of a portion of a torus, a sphere, or a section of a sphere or pyramid, or in any other size and shape to achieve the desired result of providing a means for varying the size, shape and compressibility of the cushion element of the invention. Similarly, the bladder and cushion may be scaled to fit children or other people of smaller size. Thus, some preferred embodiments of the present invention may also further comprise inflation means and valve means constructed and arranged so that the size, shape and volume of the bladder can be adjusted by the user. For example, the inflation means and the valve means may comprise a manually operable pump having at least one exhaust valve.

In accordance with aspects of the invention regarding compressibility and shape variation, the resilient cushion may be formed of or include any material that may be repeatedly expanded and compressed. Preferably, the cushion comprises foam of one or more plastics such as foam rubber, polyethylene, polypropylene and polyurethane. As is known in the synthetic foam arts, the relative resilience, compressibility and sound transmissivity of such foams may be engineered into them as desired. The cushion may also are formed of a single inflatable cell, multiple interconnecting cells, or multiple cells which are individually inflatable and deflatable. Alternatively, the cushion may be formed of multiple cells wherein some cells are sealed so that they can be neither further inflated nor deflated by the user and one or more other cells that can be controllably inflated or deflated by the user. The resilient cushion of the present invention may comprise one or more natural fiber compositions including, among others, cotton, sisal, hemp, horsehair and wool. In addition, the cushion may comprise one or more removable layers of absorbent natural or synthetic materials interposed between the face contact surface of the fabric casing and the cushion so that the invention may kept clean and can be adapted for users with allergies to plastic foams, for example.

The present invention also provides methods of manufacture so that it may be made by conventional or advanced machinery yet with high efficiency and little waste of materials. For example, with particular respect to the resilient cushion element, if can be formed from portions of simple geometric shapes. For example, a right circular cone of resilient polyurethane, formed either by molding, mechanical cutting or by laser cutting, may be reduced to a usable shape to be inserted into a fabric casing. With respect to the circular cone, a first, or frustal, cut is made in a plane parallel to the plane of the base of the cone. The resulting shape is then further modified by a cylindrical cut through the entire shape and concentric to the axis of the cone to thereby form a cylindrical void in the center of the cone. The resulting shape can then be divided into two or more parts by cuts made perpendicular to the base and through the cone's axis in a suitable number to obtain the desired number of portional elements. For example, two such perpendicular planer cut would yield four portions of the conal element.

The resulting conal portion, which is preferably of dimensions larger than the dimensions of a desired fabric casing, can then be inserted into the fabric casing so that it provides a desired amount of expansional force so that the casing fulfills its desired maximum dimensions. As one of skill in the art can appreciate, the relative size and angle of the cone's base and surface can be varied to arrive at a desired shape. Closures for the fabric casing can be, for example, one or more zippers, hook and loop fasteners or resealable adhesive tabs.

BRIEF DESCRIPTION OF THE DRAWINGS

FIG. 9 shows a flat-based right cone of resilient material, such as polyurethane.

FIG. 10 shows the cone of FIG. 9 after a frustal surface has been provided and a circular cylindrical void.

FIG. 11 shows a top view of the cone of FIG. 10 and planes for dividing the cone.

FIG. 12 shows a quarter section of the cone of FIG. 11.

DETAILED DESCRIPTION OF THE PREFERRED EMBODIMENTS

Figure 1:
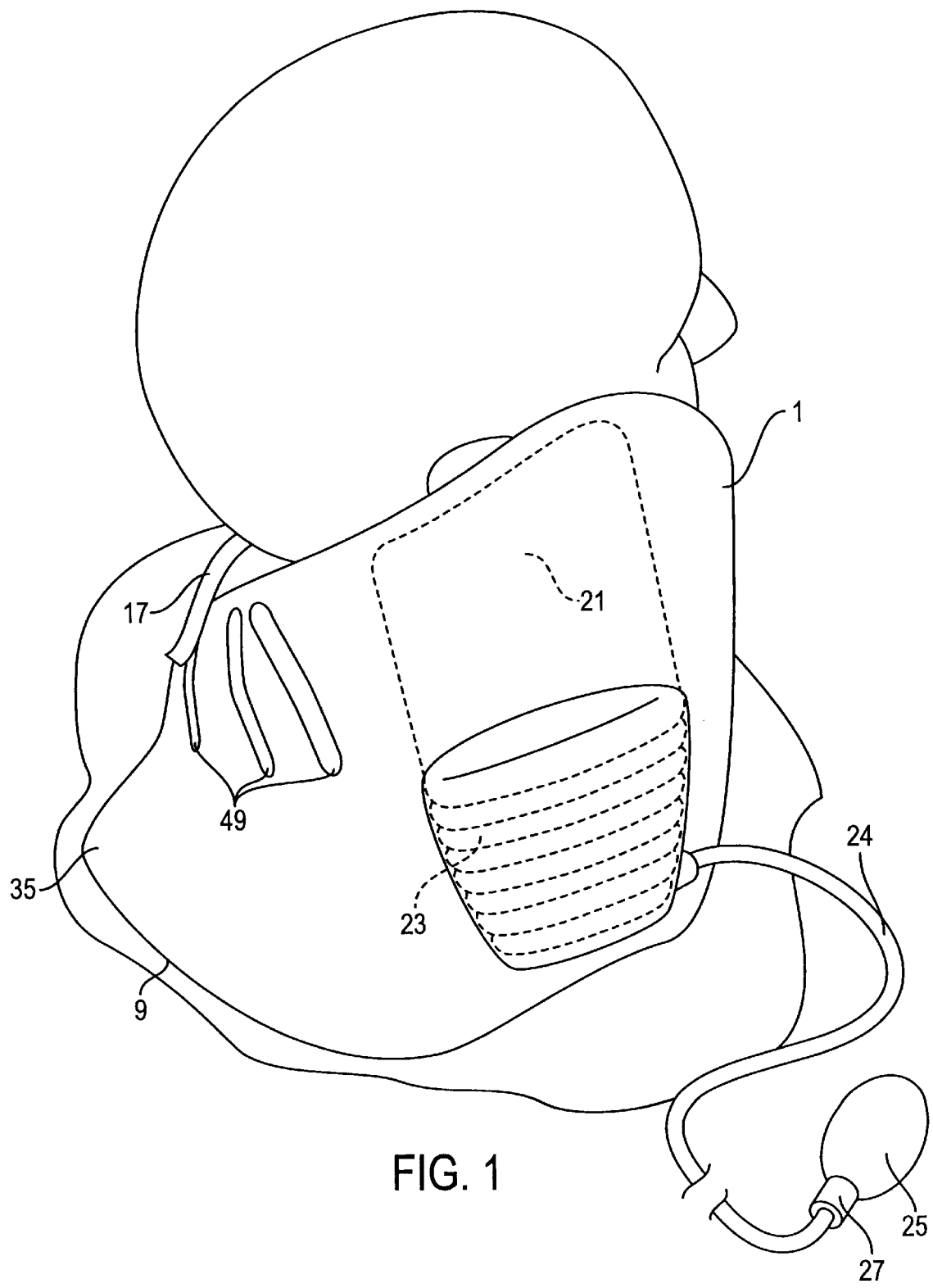
FIG. 1 is a perspective view of a preferred embodiment of the variable contour support pillow of the present invention shown attached to a user.

Some preferred embodiments of the present invention can be understood with reference to FIGS. 1–12. Like numbers in the several Figures refer to like elements. As one skilled in the art can appreciate, it is within the scope of the invention to vary the relative shapes and dimensions of the elements of the invention in order to fit various individuals. Moreover, although one preferred embodiment of the present invention consists of a cushion element and attachment strap, additional aspects of the invention allow the combination of the cushion and strap with many other elements in order to achieve the objects of the invention.

Variable contour head support 1 comprises resilient cushion 10 preferably formed of a resilient foam plastic or foam rubber shape having a shoulder contact surface 5, head support portion 12 and contoured face contact surface 3. Preferably, cushion 10 of foam plastic or rubber is encased in removable stretchable fabric casing 37. It is desirable that cushion 10 provide adequate support to the user while not being too hard or uncomfortable. Accordingly, plastic or rubber foam cushion 10 can have a density/hardness ratio index number of between HR (High Resilience) 22/40 and HR 32/80, and, most preferably, approximately HR 30/60. Alternatively, cushion 10 may be constructed with a relatively rigid or firm inside or lower portion and a relatively soft outside or upper layer most adjacent the face and shoulder contact surfaces.

Further, cushion 10 may be constructed from two or more suitably shaped pieces, or from a single integral piece of plastic or rubber foam. For example, a first piece may define the shoulder contact portion and a second piece may define the head support portion with the two pieces abutting and being adhered to one another by heat welding or adhesive. Fabric casing 37 is preferably of stretchable fabric whose maximum dimensions can determine the precise shape and maximum size of cushion 10. Thus, the plastic or rubber foam from which cushion 10 is formed can be made in dimensions larger than those of the final embodiment since the fabric cover provides compressive and shaping forces to cushion 10. Fabric casing 37 can be provided with an aperture, slit, or zipper through which the foam plastic block may inserted during manufacture or removed if the cover is to be washed. Alternatively, the aperture or slit may be bounded by a fastening mechanism such as complementary strips of a hook and loop fastening material such as that sold under the registered trademark "VELCRO."

Fabric casing 37 may also be provided on its rear surface with a number of vertically extending strips 49 of the hook portions of a hook and loop fastener. The front face of the head support portion 12 may be provided with a single strip 17 of the loop portion of a hook and loop fastener. Fabric casing 37 may comprise a non-disposable woven cloth fabric or the like, or any other suitable fabric or material. The non-disposable fabric cover is preferably washable or otherwise cleanable. Alternatively, the casing 37 may be of a spun bonded polypropylene material such as a Kimberly Clark product sold under the "EVOLUTION" registered trademark and being approximately 60 g/m², slightly porous, and disposable.

For the purposes of attaching the device to a user, cushion 10 or fabric cover 37 may be provided at appropriate places with hook and loop fasteners 49 which allow variable and adjustable placement of attachment strap 17 which, along with cushion 10 surrounds the neck of a user. Stretchable fabric cover 37 can be of a non-disposable woven cloth fabric or the like, or any other suitable fabric or material. When of a non-disposable fabric, the cover is washable or otherwise cleanable. Alternatively, fabric cover 37 may be of a disposable fabric such as spun bonded polypropylene material such as, for example, "EVOLUTION" brand fabric manufactured by Kimberly-Clark which is breathable, slightly porous and disposable.

As FIGS. 1, 2, 7 and 8 show, cushion 10 may include means for enclosing or attaching a reversably inflatable bladder so that the overall contour, shape and volume of cushion 10 may be controllably adjusted by the user. Specifically, with reference to FIGS. 1, 2, 7 and 8, inflatable bladder 23 is shown disposed within bladder chamber 21. Bladder 23 is provided with bladder inflation bulb 25, bladder deflation valve 27 and bladder inflating tube 24. As one of skill can appreciate, the size and particular disposition of the bladder and its inflation means is not limited to what is shown in the present Figures but can have many shapes, sizes and configurations in order to allow for the maximum adjustability and comfort of the user depending upon the particular embodiment of the invention.

Figure 2:
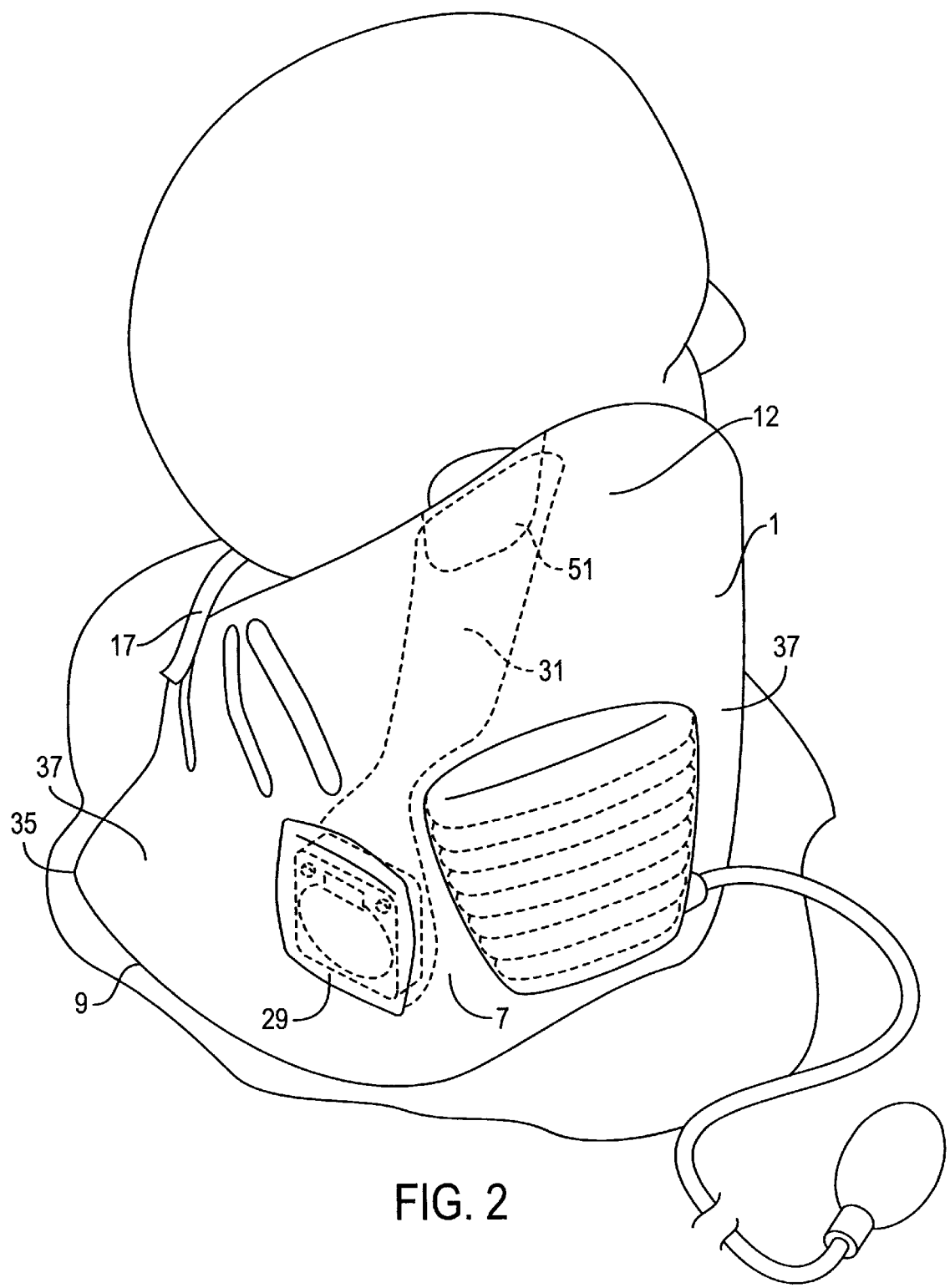
FIG. 2 is a similar view of an embodiment of the present invention showing an inflatable bladder disposed therein and an audio device and aural tube of the invention.
Figure 2A:
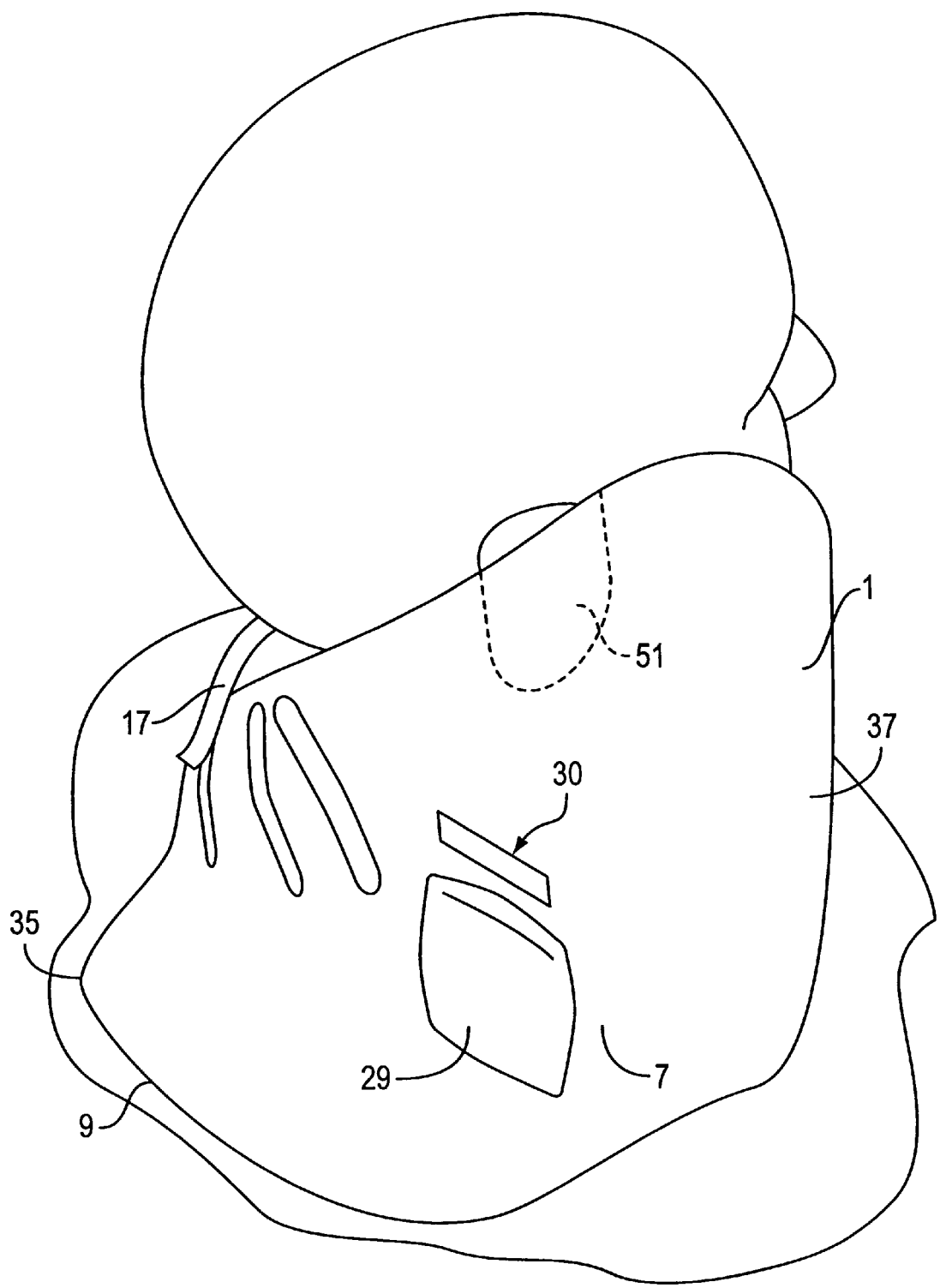
FIG. 2A shows a similar view of the invention having a pocket for an audio device, an ear hollow, and an earphone retaining strap.
Figure 2B:
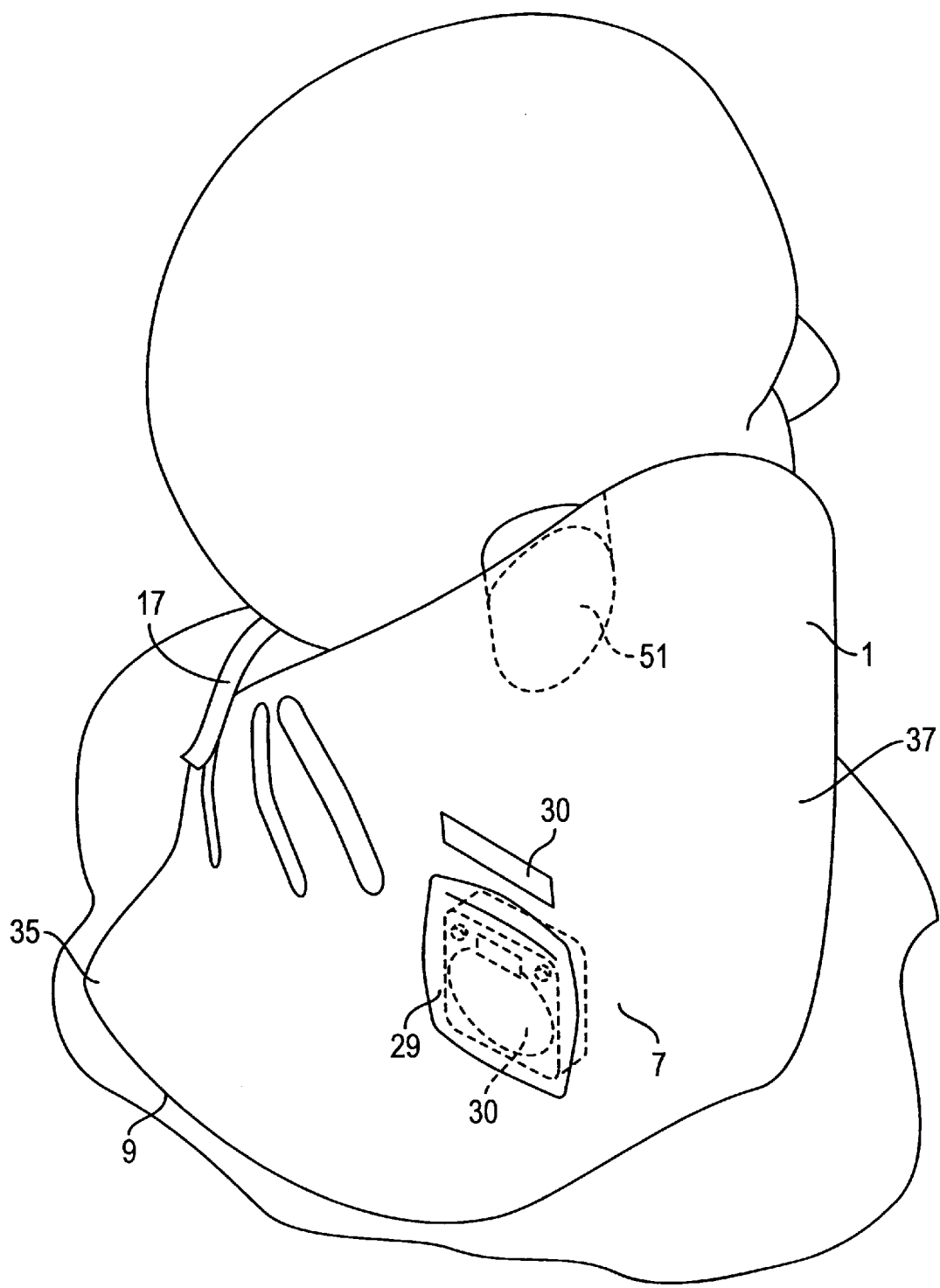
FIG. 2B shows the invention with a device pocket, an attachment strap, and an ear hollow, all without an aural tube.
Figure 2C:
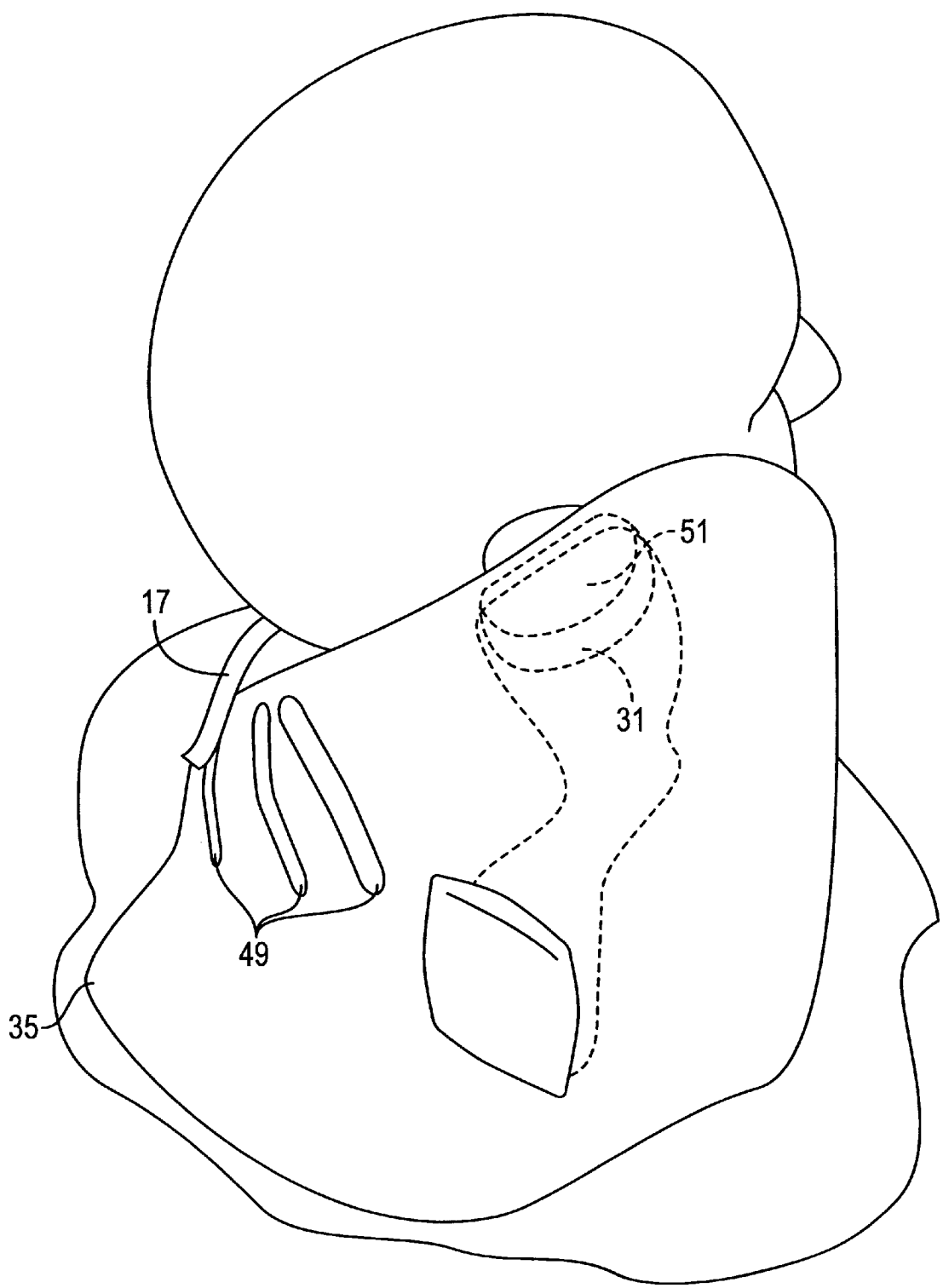
FIG. 2C shows an embodiment of the present invention having a device pocket and an aural tube ending in an ear hollow.

The present invention also provides for the inclusion of an audio device. With reference to FIGS. 2–2c, the audio device feature of the invention can be understood. Device pocket 29, which can be disposed within cushion 10, on the outside of cushion 10 or on the outside or inside of fabric body casing 37, is of appropriate size and shape to accept a desired audio device. Such audio devices include, but are not limited to, radios, clock radios, tape players, CD players, clock radios, or white noise generators. FIGS. 2a and 2b show headphone attachment strap 30 disposed near device pocket 29. Headphone attachment strap 30 can be used to attach headphones, for example, those provided by airlines, to the cushion thereby providing the user with a means for using sources of music or other entertainment provided by others such as airlines while still using the invention. In some embodiments of the invention, resilient cushion 10 is provided with device pocket 29 into which a device such as a clock, tape or compact disc player, radio or clock radio can be placed. FIG. 2A shows pocket 29 disposed on the exterior surface 7 of fabric body casing 37. However, in some embodiments of the invention device pocket 29 may be disposed within resilient body portion 1 itself. FIG. 2B shows clock radio 30 disposed within device pocket 29. As is shown in FIG. 2C, resilient cushion 10 can also be provided with aural tube 31 a void in the resilient cushion 10 extending toward that portion of resilient cushion 10 upon which a user's ear will be disposed. Preferably, resilient cushion 10 will be provided with ear hollow 51, a concave indentation disposed to receive a user's ear. In general, aural tube 31 will be configured to end near or at ear hollow 51.

Some preferred embodiments of the invention include an ear hollow 51 disposed in cushion 10 for the comfort of the user and to maintain a dependable aural connection between the user and an audio device in device pocket 29. In other preferred embodiments of the invention aural tube 31, a hollow formed through, or partially through, cushion 10, is provided so that sound transmitted from a device such as radio 30 shown in device pocket 29 of FIG. 2b functions with maximum efficiency in providing the desired audio output to the user while not disturbing others located nearby.

It will be appreciated that the resilient cushion 10 should have overall dimensions which are adequate to allow the user's head to rest against the face portion while the shoulder contact portion of cushion 10 extends down to contact and rest upon the shoulder of the user. In this regard, the shoulder contact surface of resilient cushion 10 is preferably at least approximately 3 inches wide and as wide as approximately 6 inches. With respect to the face contact surface, cushion 10 extends upwardly to at least the level of the lower ear, and preferably as high as the middle of the user's ear, and more preferably to the upper limits of the ear of a user. As one of skill in the art can appreciate, the dimensions of the present invention are adjustable and variable by means of the interactions of the various elements such as the inflatable bladder, positioning scrim and adjustment strap in order to conform the device to an individual user.

Figure 3:
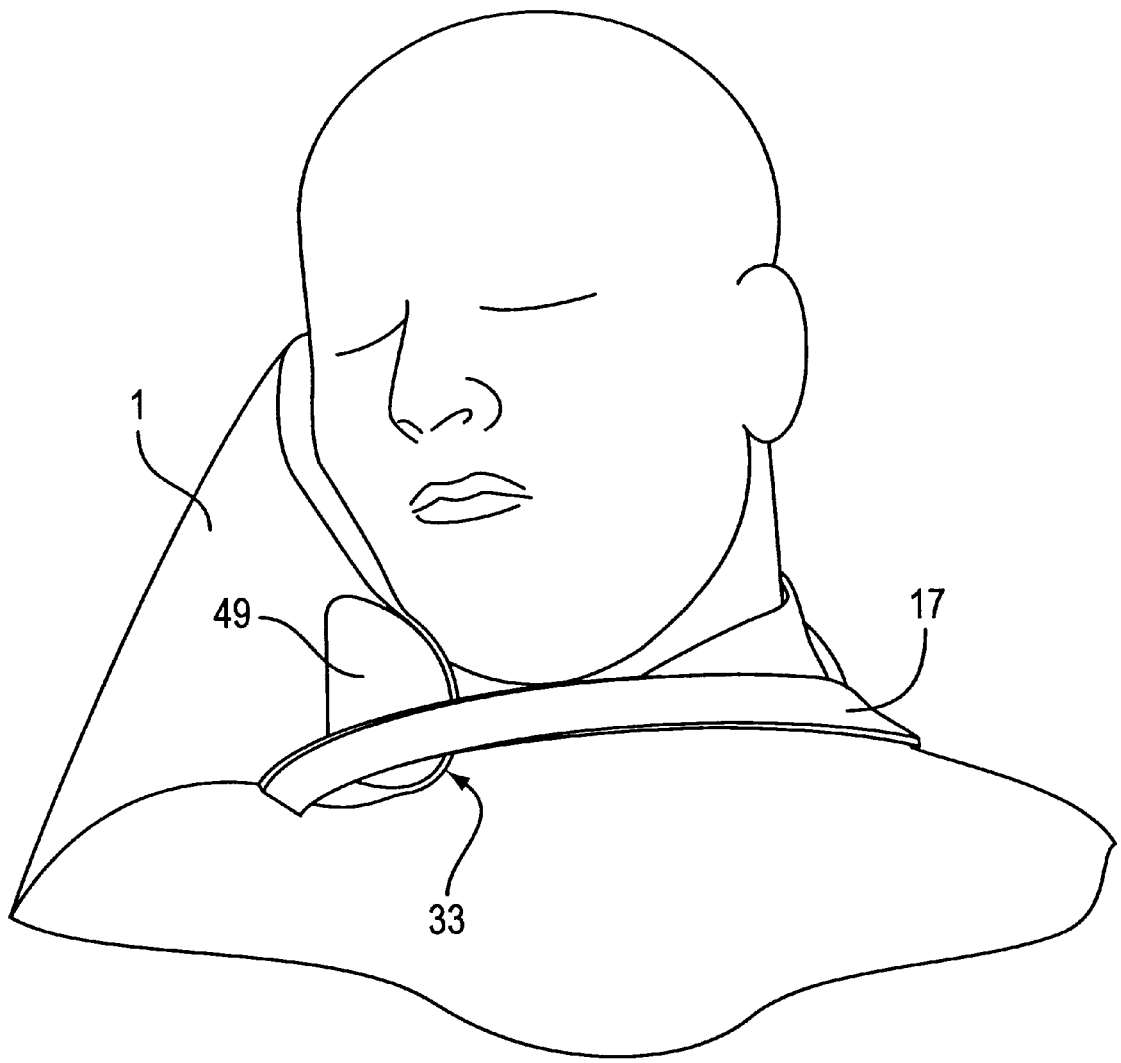
FIG. 3 is an oblique frontal view of any of the previous embodiments showing attachment of the cushion using an attachment strap.
Figure 4:
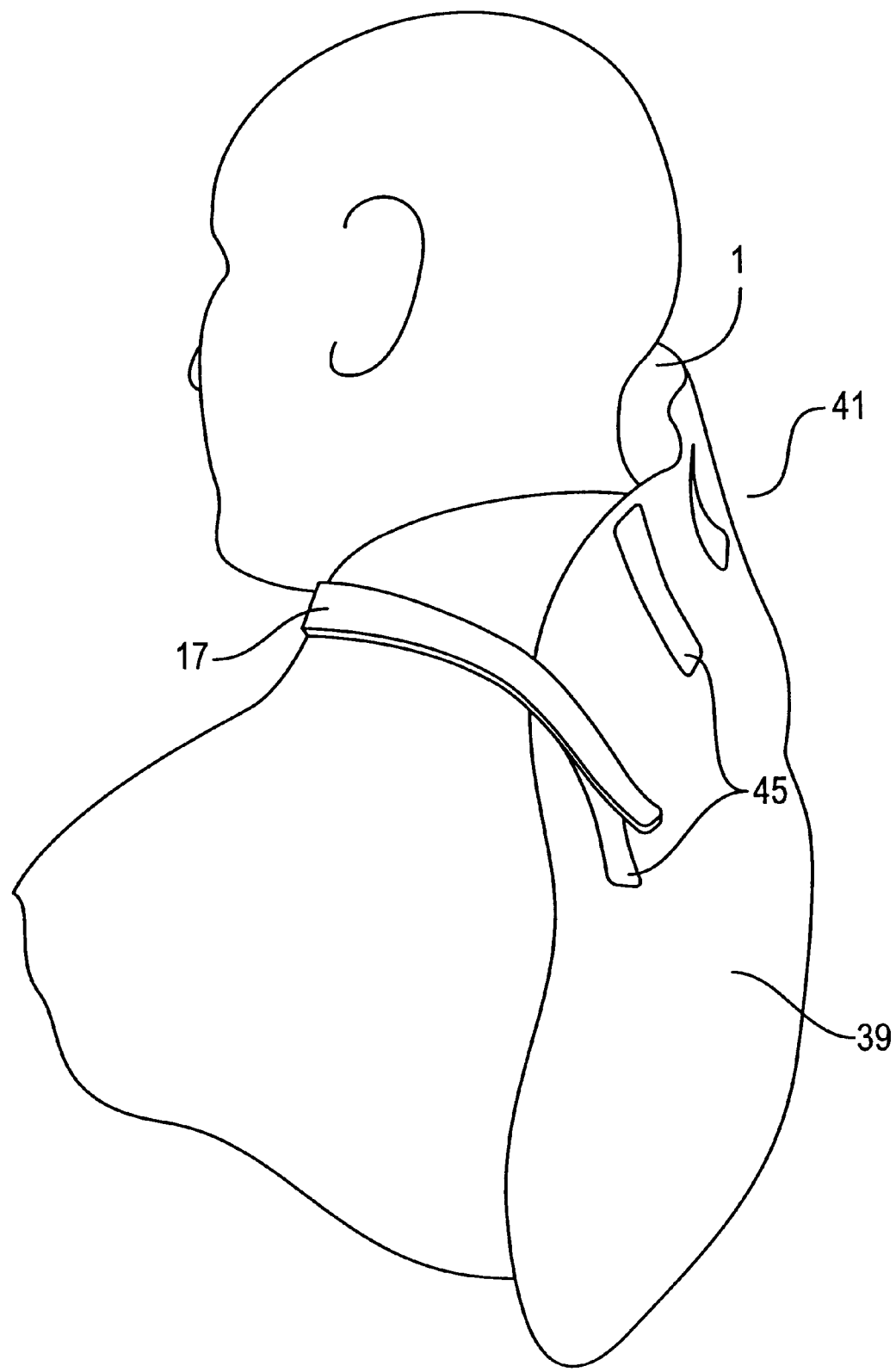
FIG. 4 is a left rear oblique view of an embodiment of the invention showing both an attachment strap and a positioning scrim for positioning the device with respect to the head, neck, and shoulders of a user.
Figure 5:
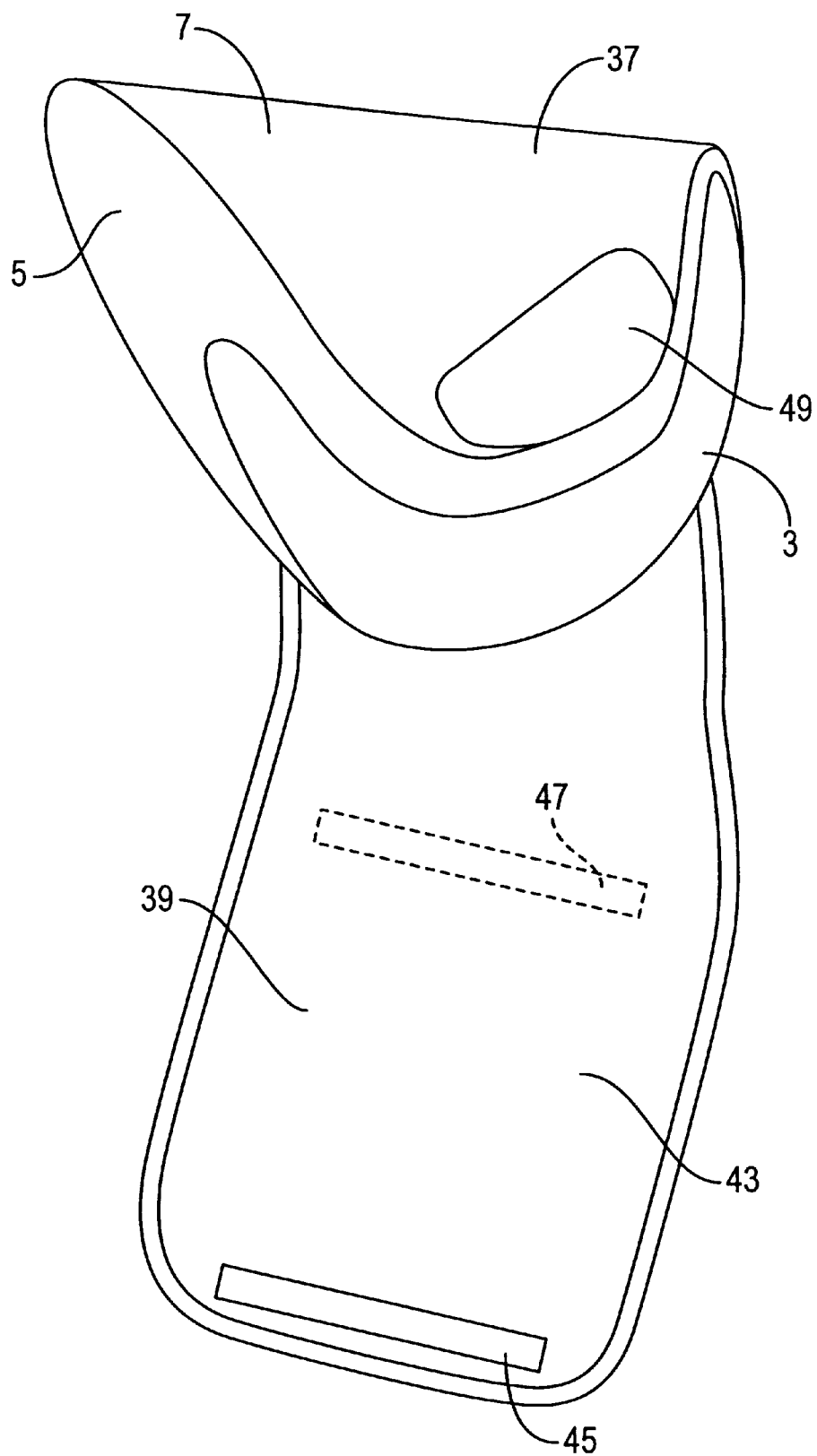
FIG. 5 shows the embodiment of FIG. 4 in an unattached position.

In FIG. 3, strap 17 is shown around a user's neck and ending in strap hook and loop fastener 49 disposed near resilient cushion front apex 33. Similar features are depicted in FIG. 4 wherein attachment strap 17 is shown connecting to hook and loop fasteners 49 disposed upon cushion 10. A positioning scrim 39 is provided in some embodiments of the invention for interposition between the back of the user and a chair or couch in which the user is seated. For example, in FIGS. 4 and 5 positioning scrim 39 comprising scrim friction fabric 43 is attached to resilient cushion 10 at scrim attachment area 41. Scrim 39 of scrim friction fabric 43 is provided with hook and loop fastener strips 45 and 47. Preferably, strip 47 is the hook strip since it faces away from the back of the user when the invention is in use such that scrim 39 is interposed between the back of the user and the back of a chair or other seat. FIG. 5 depicts also contoured shoulder surface 5 and exterior surface 7 of resilient cushion 1 covered with fabric body casing 37. Resilient cushion 10 also includes contoured face surface 3 which may be provided with a fabric different from that of fabric casing 37 for the comfort of the user.

Figure 6:
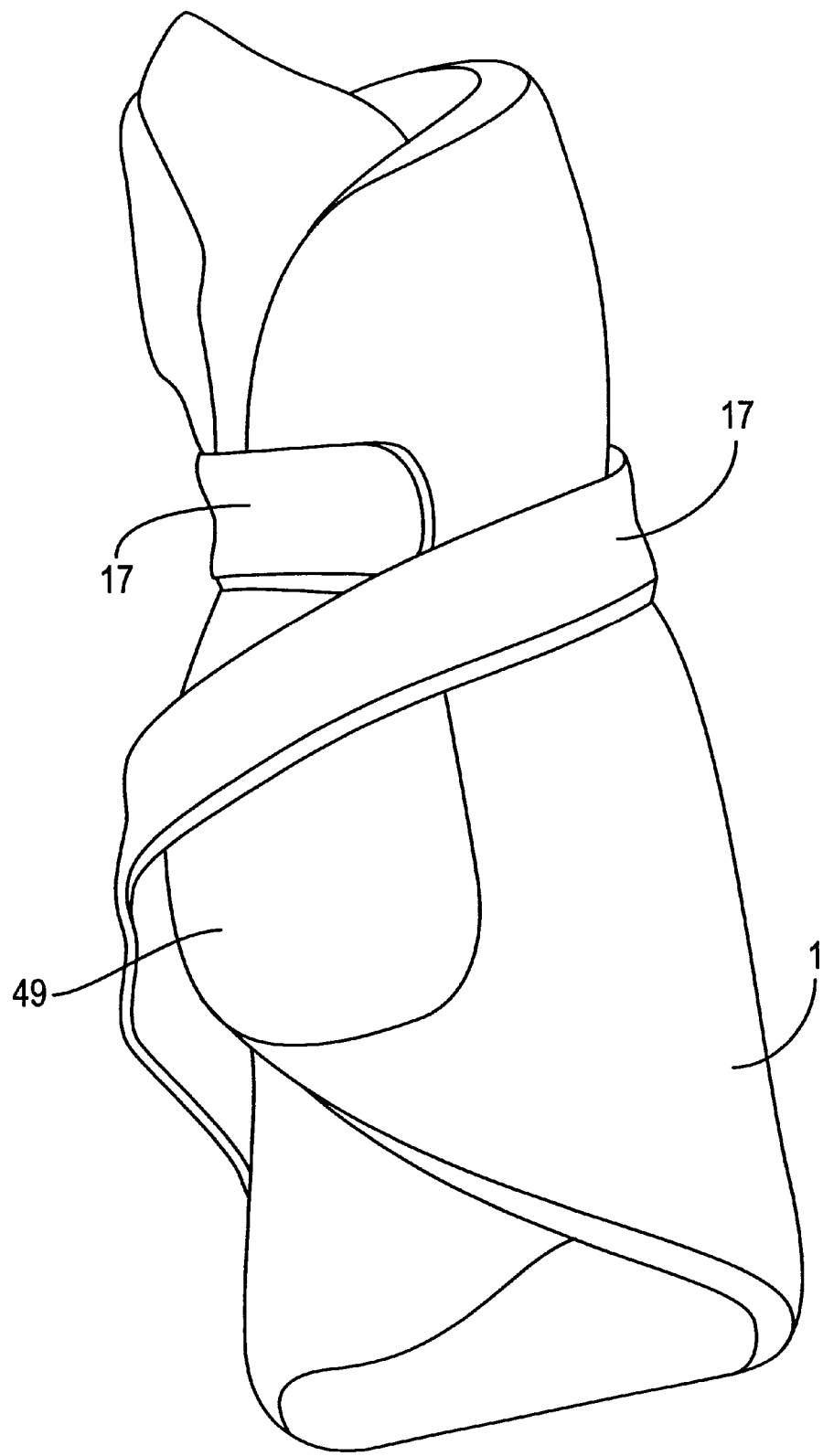
FIG. 6 shows an embodiment of the present device compressed and held in compacted condition by means of an attachment strap.

FIG. 6 shows the embodiment of the invention as shown in FIG. 5 but disposed for storage. In its storage disposition, resilient cushion 10 is compressed and formed into a roll using attachment strap 17 and strap hook and loop fasteners 45 and 47 of scrim 39 to assist in retaining the device in its compressed shape. When the invention is to be stored or transported, it can be rolled up into a compressed roll and the loop strip 17 engaged with one of the hook strips 16 to retain the cushion 10 in its compressed state. The invention can also be configured such that one or both of attachment strap 17 and positioning scrim 39 can be used to maintain cushion 10 in its compressed storage state.

Figure 7:
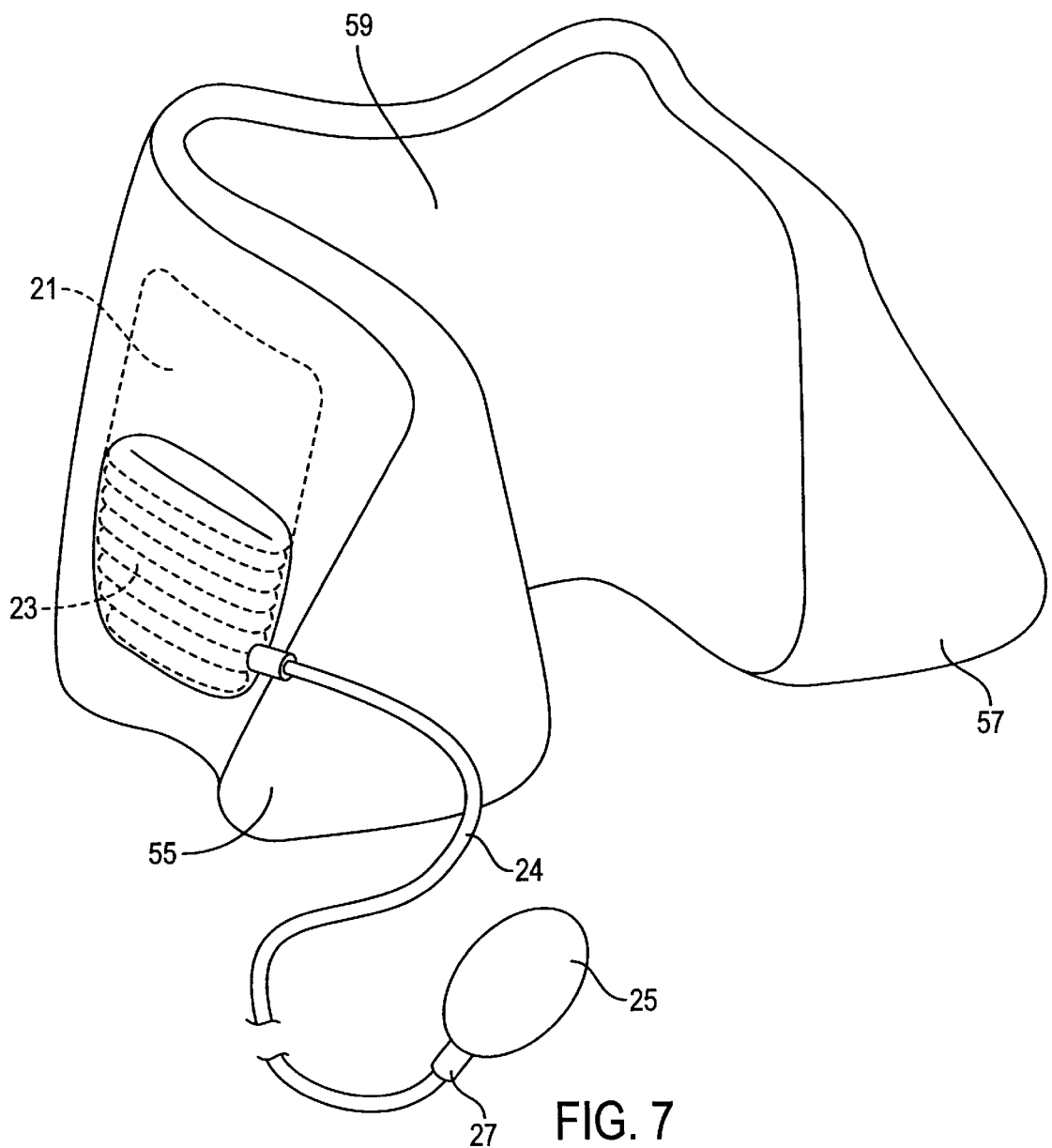
FIG. 7 shows a bilateral embodiment of the device with an inflatable bladder and means for inflating and deflating the bladder.
Figure 8:
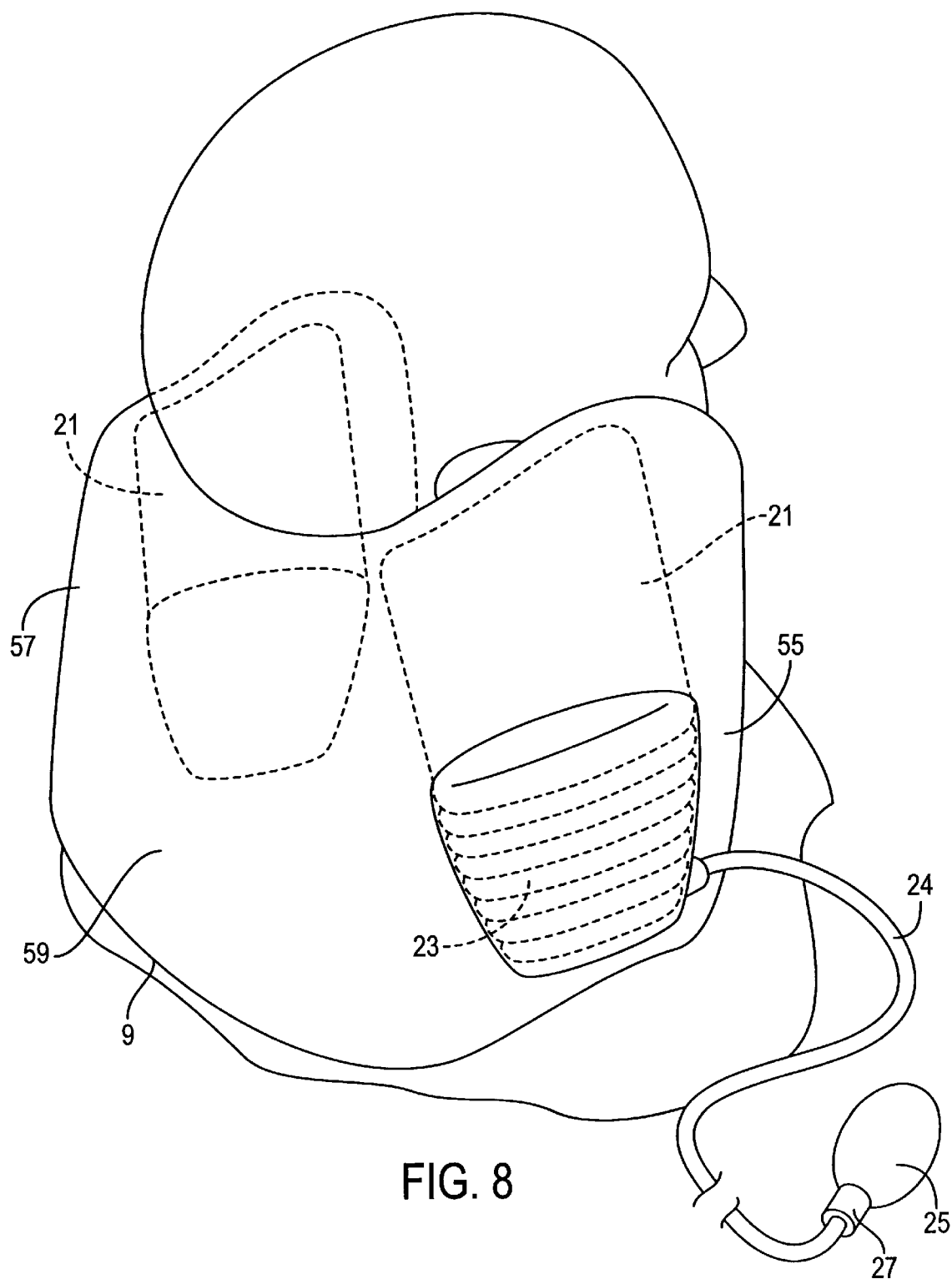
FIG. 8 is a rear oblique view of the device of FIG. 7.

The present invention provides also for bilateral embodiments wherein cushion 10 is modified to comprise left, right and connecting portions. FIGS. 7 and 8 depict a bilateral embodiment of the present invention having right resilient body portion 55 and left resilient body portion 57 connected by rear resilient body portion 59. Two-sided embodiments of the invention can be provided with one or more inflatable bladders 23 within one or more bladder cavities 21 in order to allow adjustment to the shape, volume and contour of the cushion. Similarly, one or more audio device pockets (not shown) or other elements can be provided in bilateral embodiments of the invention.

In accordance with other aspects of the invention, the resilient cushion component of the invention can be made advantageously and simply by means of primary geometric cuts through a cone of resilient foam material. Thus, with simple cutting equipment, whether manual or computer-directed, cuts which form simple geometric shapes, such as cones, circles and planes, can be utilized to form shapes for resilient cushion 10. When such shapes are employed, they are preferably used in conjunction with fabric cover 37 which is held in its desired shape by the expansive force of the shape.

Figure 10:
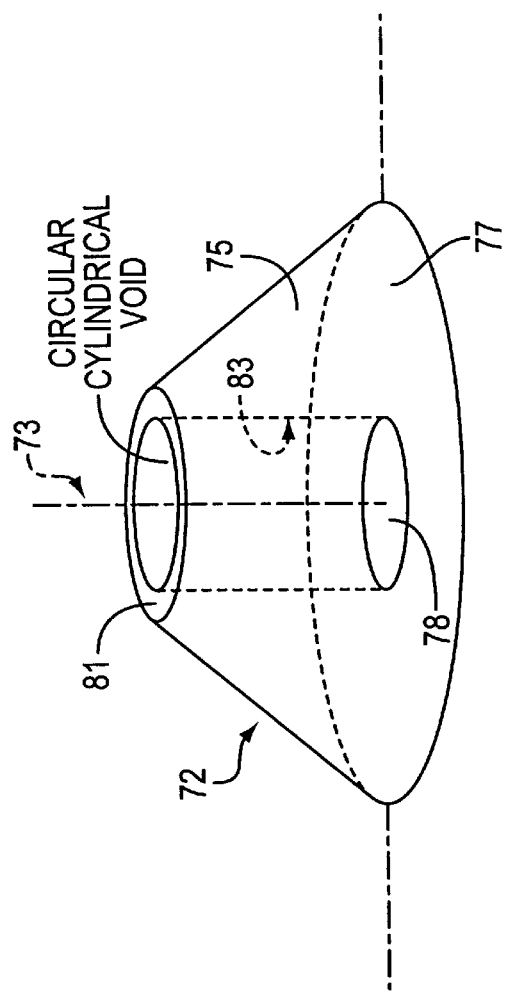
FIGS. 9–12 show one preferred method for forming the resilient cushion inner material of the present invention.
Figure 9:
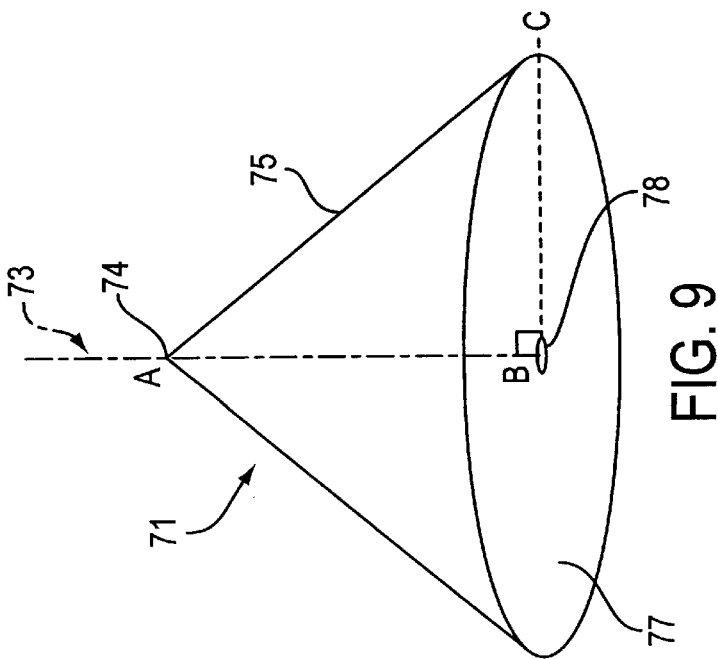

With reference to FIGS. 9 through 12, one such method of inexpensively manufacturing foam material shapes for cushion 10 is described. With reference to FIG. 9, right circular Cone 71 has circular base 77, center 78, and outer surface 75. Cone 71 can be formed by rotating right triangle A-B-C about Axis 73 through center 78. A is thus congruent with vertex 74 and B is congruent with base center 78. Cone 71 is preferably of open or closed cell polyethylene, polyurethane or polyvinyl chloride (PVC). With reference to FIG. 10, initial steps in forming resilient cushion sections can be seen. Two cuts are made in Cone 71, one cut forming a plane parallel to circular base 77 and perpendicular to Axis 73 thereby forming frustal surface 81. Another cut forms a circular cylindrical void 79 whose axis is congruent with Axis 73 of Cone 71. Preferably frustal surface 81 is formed prior to forming circular cylindrical void 79, however, either order is satisfactory to form the shape as generally depicted in FIG. 10.

Figure 12:
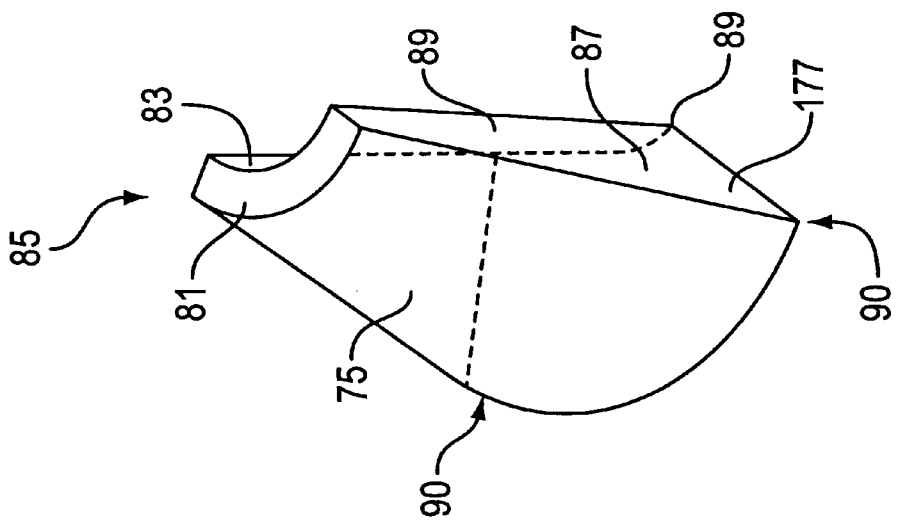
Figure 11:
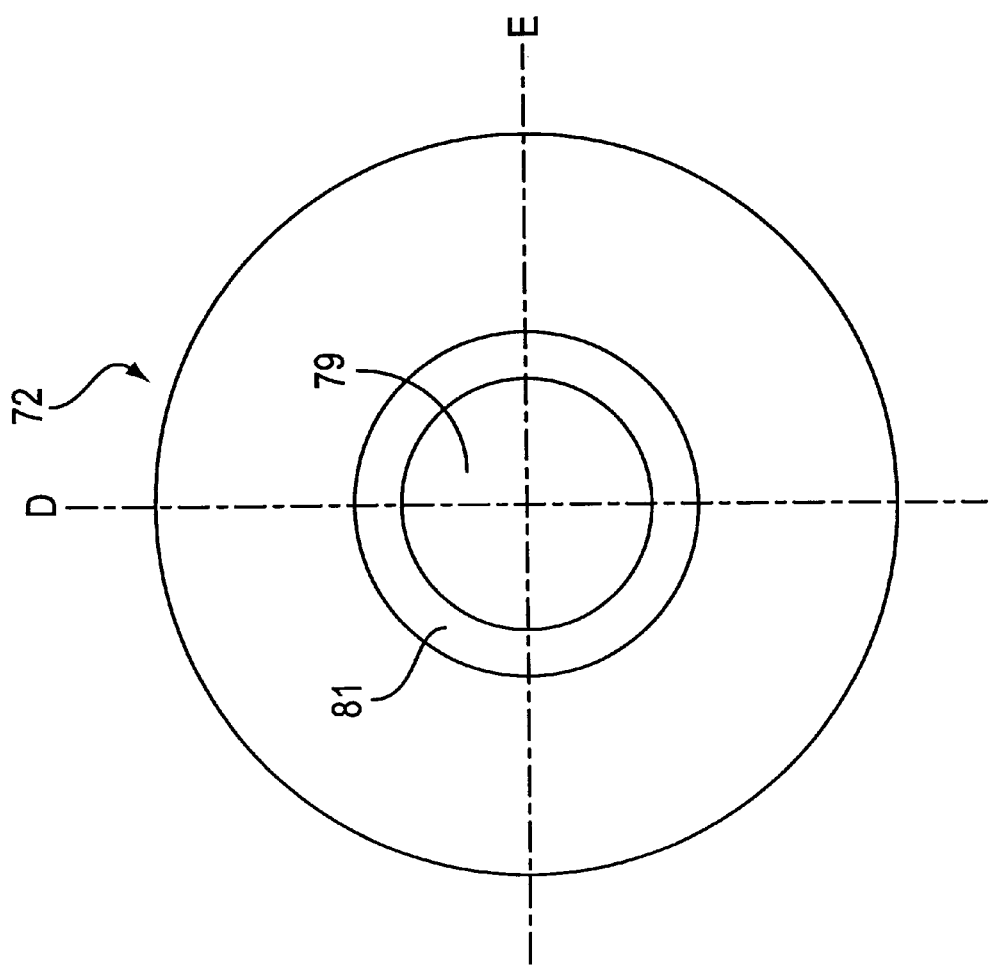

By varying the relative distance between conical base 77 and the parallel cut which forms frustal surface 81, the relative size of frustal surface 81 can be varied as desired. FIG. 11 is a top view of Cone 72 after further processing. Frusto-conical solid 72 can be cut into a varying number of sections. For example, as shown in FIG. 11, cuts D and E are made in planes perpendicular to one another and through Axis 73 thus cutting frusto-conical solid 72 into four sections. One of such sections is shown in FIG. 12. Section 85 has inner surface 83 frustal surface 81 outer conical surface 75 outer apices 90 and inner apices 89. Also, by varying the lengths of the diameter of circular base 77 and Axis 73, the angle formed by the side of Cone 71 and its base 77 can be varied also.

As one of skill in the art can appreciate, the present invention can be manufactured in numerous permutations of cushion 10 combined with other elements. Such elements include, for example, reversably inflatable bladders 23 and chambers 21, device pockets 29, ear hollows 51, and aural tubes 3. The present invention includes embodiments combining some or all of the aforesaid elements and features.

As those of skill in the art will comprehend, numerous permutations and modifications may be made to the contoured head support and methods of manufacture of the invention described herein without departing from the scope and spirit of the invention as broadly described.

What is claimed is:

1. A contoured head support for providing support to the head and neck of a user comprising:

A) a resilient cushion comprising
at least two attachment areas for attaching a retaining strap, a shoulder contact surface shaped for contact with a shoulder of a user, a head contact surface shaped for contact with a side of the head of a user, said head contact surface constructed and arranged to extend upwardly to at least the ear of said user when in use,
wherein said resilient cushion is constructed and arranged to be firm enough to support the weight of the user's head when in use and compressible enough to be compressed for storage when not in use,
wherein said resilient cushion is constructed and arranged to be supported solely by the user when in use, and B) a retaining strap constructed and arranged to be demountably attachable to said cushion at said at least two attachment areas and to pass around the neck, shoulder or torso of said user.

2. The device of claim 1, further comprising a fabric casing enclosing said resilient cushion.

3. The device of claim 2, wherein said fabric casing is constructed and arranged such that the shape and maximum dimensions of said resilient cushion are determined by the dimensions of said casing.

4. The device of claim 2, wherein said retaining strap is attached to lower portions of said cushion or to said fabric casing.

5. The device of claim 1, further comprising C) a positioning scrim attached to said resilient cushion and constructed and arranged so that the position of said cushion with respect to said user's head, neck and shoulder is determined at least partly by the position of said scrim.

6. The device of claim 5, wherein said positioning scrim is constructed and arranged to lie disposed across a portion of the back of said user so that it is reversibly interposed between said back and a surface upon which said user is leaning.

7. The device of claim 5, wherein said positioning scrim is formed of one or more materials from the group consisting of fabrics of natural fibers, fabrics of synthetic fibers, webbing of natural or synthetic fibers or netting material of natural or synthetic fibers.

8. The device of claim 5, wherein said positioning scrim is elastically conformable to the contour of a user's back.

9. The device of claim 5, wherein said positioning scrim is constructed and arranged so that, when said cushion is compressed, said scrim forms a container for said cushion.

10. The device of claim 1, wherein said resilient cushion further comprises an ear hollow constructed and arranged in said head contact surface of said cushion to receive at least a portion of an ear of said user.

11. The device of claim 10, wherein said resilient cushion further comprises an audio pocket for attaching or enclosing an audio device to said cushion.

12. The device of claim 11, wherein said resilient cushion comprises means for transmitting sound from said audio pocket through said cushion to an ear of said user.

13. The device of claim 12, wherein said means for transmitting sound from said audio pocket through said cushion to an ear of said user is an aural chamber disposed within said resilient cushion.

14. The device of claim 13, wherein said aural chamber is disposed between said audio pocket and said ear hollow.

15. The device of claim 13, wherein said cushion is provided with a speaker disposed between said audio pocket and said ear hollow and having wiring and connector means leading into said pocket for connecting to an audio device disposed within said pocket.

16. The device of claim 1, wherein said resilient cushion further comprises an audio pocket for attaching or enclosing an audio device to said cushion.

17. The device of claim 8, wherein said audio device is one or more from the group consisting of radios, compact disc players, recordable chips, mechanically powered audio devices, alarm clocks, clock radios and headphone speakers.

18. The device of claim 16, wherein said resilient cushion further comprises means for transmitting sound from said audio pocket through said cushion to an ear of said user.

19. The device of claim 18, wherein said means for transmitting sound from said audio pocket through said cushion to an ear of said user is an aural chamber disposed within said resilient cushion.

20. The device of claim 1, wherein said retaining strap is adjustable.

21. The device of claim 20, wherein said adjustable retaining strap is constructed and arranged to surround the neck of said user.

22. The device of claim 1, wherein said resilient cushion further comprises means for varying its relative dimensions so that its shape and size may be adjusted to conform to the head and neck of said user and to support said head relative to said shoulder as desired by said user.

23. The device of claim 22, wherein said means for varying the relative dimensions of said resilient cushion comprises means for adjusting the distance between said shoulder contact surface and said head contact surface.

24. The device of claim 23, wherein said means for varying the relative dimensions of said cushion is a bladder which resides within a hollow in said resilient cushion wherein said bladder can be inflated and deflated by said user to adjust the absolute and relative dimensions of said resilient cushion.

25. The device of claim 24, further comprising inflation means and valve means constructed and arranged so that the volume of said bladder can be adjusted.

26. The device of claim 24, wherein said inflation means and said valve means comprise a manually operable pump having at least one exhaust valve.

27. The device of claim 1, wherein said resilient cushion comprises foam of one or more plastics from the group consisting of foam rubber, polyethylene, polypropylene and polyurethane.

28. The device of claim 1, wherein said resilient cushion comprises one or more natural fiber compositions from the group consisting of cotton, sisal, hemp, horsehair and wool.

29. A contoured head support for providing support to the head and neck of a user comprising:

A) a resilient cushion comprising at least two attachment areas for attaching a retaining strap, a shoulder contact surface shaped for contact with a shoulder of a user, a head contact surface shaped for contact with a side of the head of a user, said head contact surface constructed and arranged to extend upwardly to at least the ear of said user when in use, wherein said resilient cushion is constructed and arranged to be firm enough to support the weight of the user's head when in use and compressible enough to be compressed for storage when not in use, wherein said resilient cushion is constructed and arranged to worn by the user when in use, and B) a retaining strap constructed and arranged to be demountably attachable to said cushion at said at least two attachment areas and to pass around the neck, shoulder or torso of said user.

* * * * *